United States Patent Office 3,705,931
Patented Dec. 12, 1972

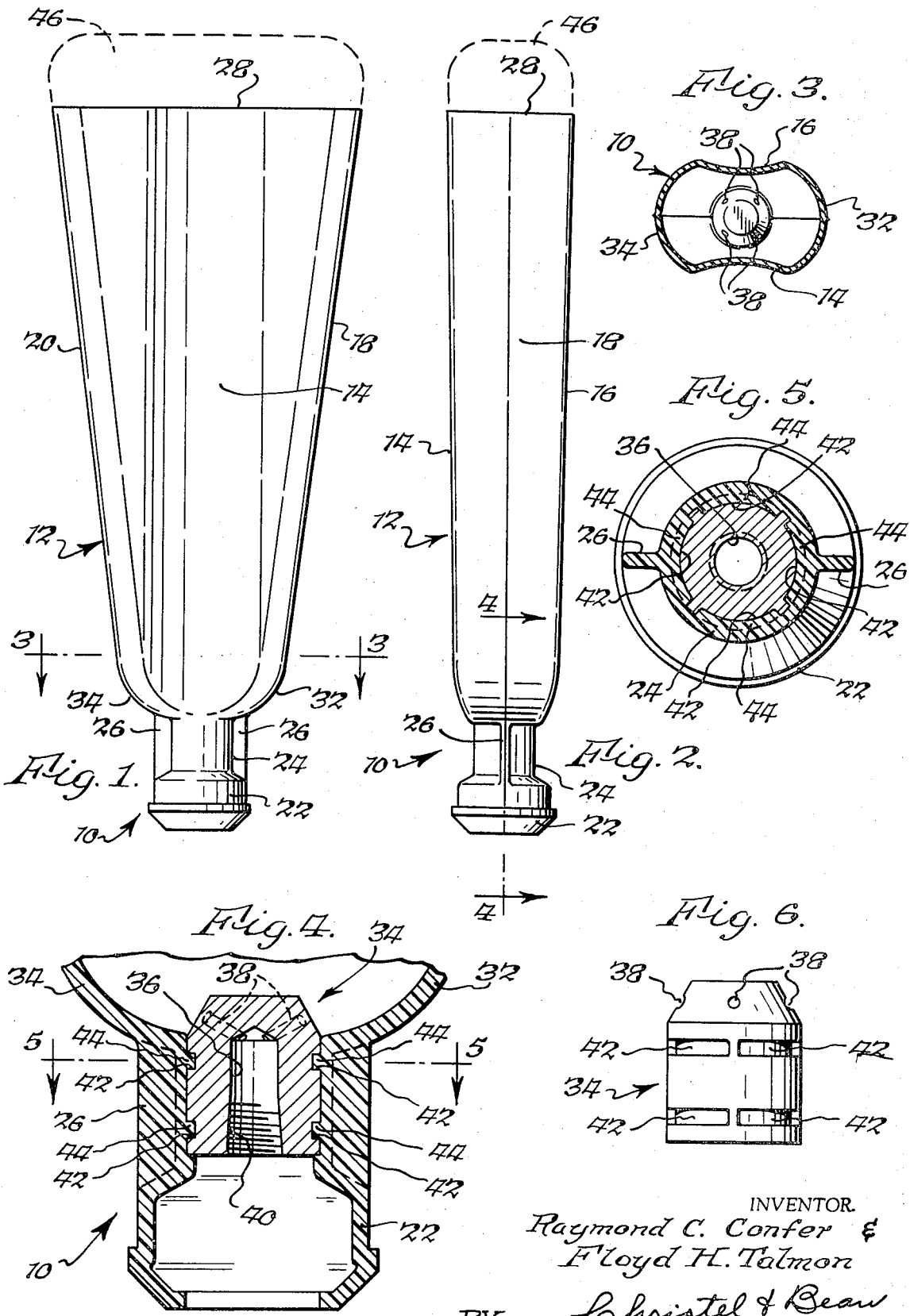

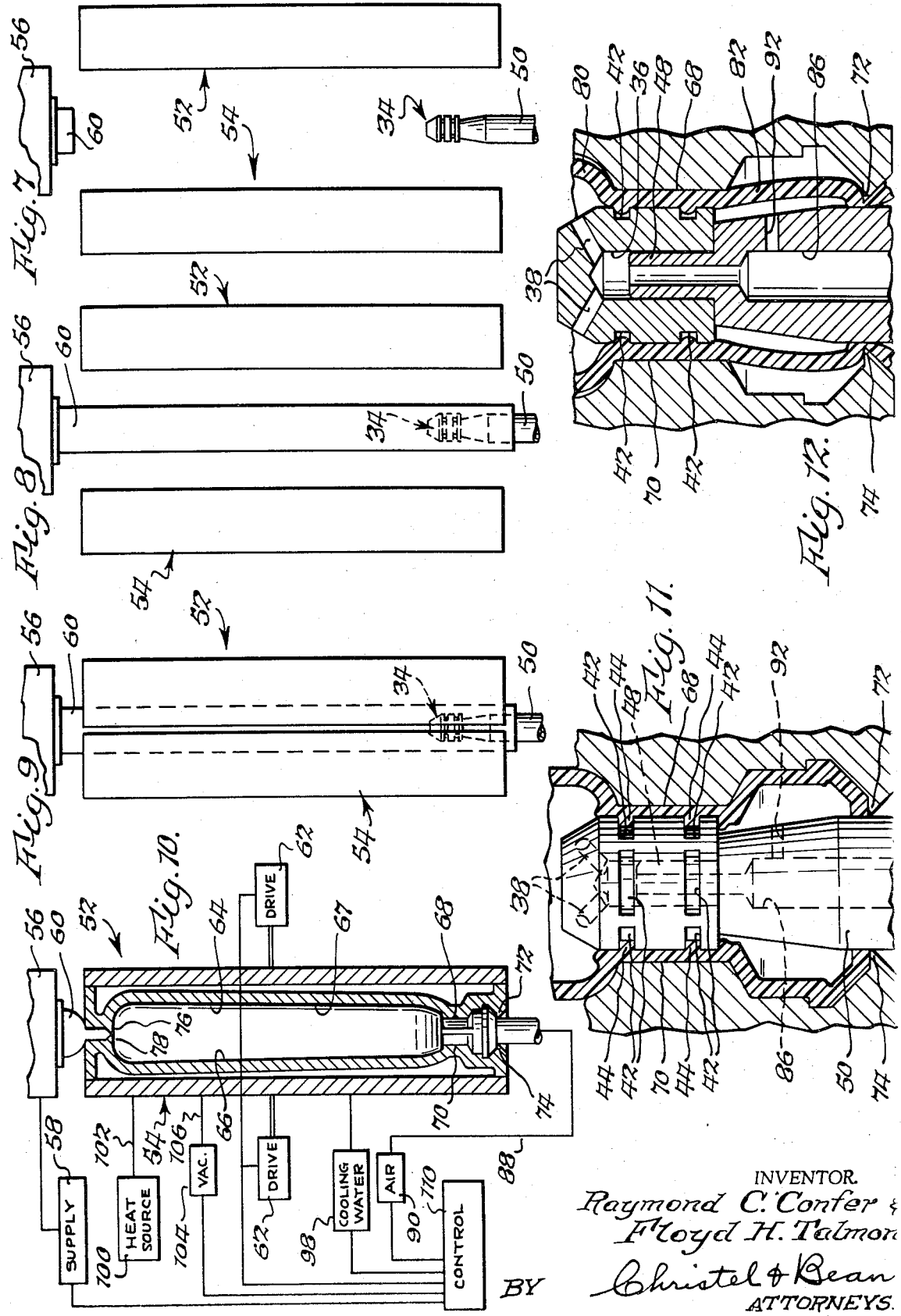

3,705,931
METHOD FOR BLOW MOLDING AND COMPRESSION MOLDING THERMOPLASTIC MATERIAL
Raymond C. Confer, Gasport, N.Y., and Floyd H. Talmon, Fairview Park, Ohio, assignors to Air-Lock Plastic, Inc., Tonawanda, N.Y.
Filed Mar. 23, 1970, Ser. No. 21,945
Int. Cl. B29c 17/07; B29d 3/00
U.S. Cl. 264—89                                    5 Claims

ABSTRACT OF THE DISCLOSURE

A method of blow molding an article having an insert permanently affixed thereto. The insert is placed on a mounting fixture between complementary mold sections. An extruded parison is fed around the insert and the mold sections are closed about the parison for enclosing a portion of the same. Opposed lands on the mold sections compress a portion of the enclosed parison against the insert and separate the enclosed parison into two hollow sections. Air is introduced into the two hollow sections to expand the same into conformity with the cavity defined by the mold sections.

BACKGROUND OF THE INVENTION

The present invention relates generally to the blow molding of thermoplastic material and, more particularly, to a method of blow molding plastic articles having insert members permanently secured therein as an integral part of the molded article.

Plastic molded articles, such as nozzles, containers, receptacles, and the like have found increasing acceptance in recent years and are used extensively in lieu of similar metal articles because they are relatively inexpensive, lighter in weight, durable and corrosion resistant. It is sometimes necessary to provide such plastic molded articles with inserts of varying types, such as threaded couplings in container outlets or nozzle inlets for example, for receiving hose couplings, valve assemblies or closure members.

These inserts are commonly introduced into the plastic molded article and assembled therewith after the article has been formed. This procedure presents various problems, such as accurately positioning or orienting the insert relative to the article, firmly securing the insert in the desired location and providing an adequate adhesive or fastener for locking the insert in place. The above practice is laborious and expensive. Also, a number of separate parts are often necessary, thereby increasing the inventory of stock required and adding significantly to the assembly costs of producing such articles.

SUMMARY OF THE INVENTION

It is an object of the present invention to provide a method of molding plastic articles of one-piece construction having insert members permanently affixed thereto.

It is another object of this invention to provide a method of blow molding plastic articles and securing inserts members thereto by compression molding.

It is a further object of the present invention to provide a method utilizing a combined blow molding and compression molding apparatus for forming plastic articles having insert members formed integral therein.

The method of this invention for molding articles into shape having inserts permanently affixed thereto is characterized by placing an insert onto a mold mounting fixture disposed between complementary mold parts and vertically aligned with a die for extruding a tubular parison of molten plastic material. The lower end of the parison engages and envelopes the insert and the mold parts are closed about the parison to sever and enclose the parison and compress portions of the ecnlosed parison about the insert. An expansion fluid is introduced through the mounting fixture and the insert into the interior of the parison for expanding the same into engagement with the cavity walls of the mold parts, which cavity walls define the outer configuration of the molded article.

The foregoing and other objects, advantages, and characterizing features of the present invention will become clearly apparent from the ensuing detailed description thereof, taken together with the accompanying drawings wherein like reference characters denote like parts throughout the various views.

BRIEF DESCRIPTION OF THE DRAWINGS

FIG. 1 is a front elevational view of a nozzle formed by the method and apparatus of this invention;

FIG. 2 is a side elevational view of the nozzle of FIG. 1;

FIG. 3 is a horizontal sectional view taken about on line 3—3 of FIG. 1;

FIG. 4 is a fragmentary vertical sectional view, on an enlarged scale, taken about on line 4—4 of FIG. 2;

FIG. 5 is a horizontal sectional view taken about on line 5—5 of FIG. 4;

FIG. 6 is a side elevational view of a metal insert incorporated in the nozzle of FIG. 1;

FIGS. 7–9 are schematic views illustrating the mold parts of this invention in various positions relative to the tubular parison;

FIG. 10 is a schematic layout of a complete apparatus of the present invention;

FIG. 11 is a fragmentary vertical sectional view of the lower portion of the mold apparatus shown in FIG. 10; and FIG. 12 is a view similar to FIG. 11 but showing the mold apparatus in the position illustrated in FIG. 9.

DETAILED DESCRIPTION OF A PREFERRED EMBODIMENT

Referring now to the accompanying drawings, there is shown apparatus of this invention for molding a thermoplastic article of the type illustrated in FIGS. 1–5. The specific article depicted in FIG. 1 is a discharge nozzle, generally designated 10, adapted to be connected to a fire extinguisher, for example, by a flexible conduit for discharging the fire extinguisher contents in a spray form.

Nozzle 10 is of a unitary, one-piece construction, formed of a thermoplastic material, such as polyethylene for example, and comprises a hollow body 12 having generally parallel front and rear walls 14 and 16, and a pair of side walls 18 and 20 forming an enclosure. The inlet end of nozzle 10 is provided with a head 22 connected to body 12 by a reduced neck portion 24. A pair of ribs 26 project laterally outwardly from the opposite sides of neck portion 24 and extend between head 22 and body 12. The outlet end of nozzle 10 is provided with an elongated opening 28. It will be seen that sidewalls 18 and 20 taper downwardly and inwardly from the inlet end toward the outlet end and terminate in curved shoulder portions 30 and 32 adjacent neck portion 24. Although nozzle 10 is preferably formed of polyethylene, it should be understood that nozzle 10 can be composed of any suitable thermoplastic material.

A metal insert, generally designated 34, is permanently secured within neck portion 24 and is provided with an axial passage 36 terminating adjacent the inner end of insert 34 and communicating with a plurality of passages 38 extending through the bottom wall of insert 34 and communicating with the interior of body 12. Although four passages 38 extending radially outwardly at an oblique angle and spaced evenly about insert 34 are provided in the preferred embodiment, it should be appreciated that any required or desired number of such passages arranged in any desired pattern can be employed as dictated by the particular application. Passage 36 is threaded as shown at 40 in FIG. 4 for receiving a hose coupling or the stem of a valve assembly for controlling the discharge flow of the fire extinguisher contents through passages 36, 38 and body 12.

Insert 34 is provided with a plurality of arcuate grooves 42 formed in the outer wall surface thereof for accommodating projections 44 extending radially inwardly of the inner wall surface of neck portion 24. Projections 44 are compressed into grooves 42 during the molding operation, hereinafter described, to firmly secure insert 34 in place within neck portion 24 as an integral part thereof.

An end portion 46, shown in dotted line in FIGS. 1 and 2, is formed during the molding operation, but is removed from body 12 and discarded leaving the nozzle in finished form as shown in FIGS. 1 and 2. It should be understood that the article depicted in FIGS. 1 and 2 is only illustrative of the type of article produced by this invention and that the method and apparatus of the present invention is in no manner restricted to producing such articles but can be employed to produce a wide variety of differently shaped plastic molded articles having inserts permanently affixed therein.

In accordance with the present invention, insert member 34 is molded integrally with nozzle 10 by a blow molding and compression molding operation as follows:

Referring now to FIGS. 7–12, a metal insert 34 is placed on the reduced end portion 48 of a mounting fixture 50 disposed between a pair of split mold sections, generally designated 52 and 54 and vertically aligned with the outlet of an extrusion die 56. Molten plastic material, such as plasticized polyethylene for example, is fed into extrusion die 56 by conventional feed means, not shown, from a suitable supply 58 (FIG. 10). The molten plastic material is extruded from die 56 in a generally circular tubular shape forming a parison 60 which is gravity fed downwardly between mold sections 52 and 54 which are mounted for movement into and out of engagement about parison 60. Mold sections 52 and 54 can be pivotally mounted or otherwise supported and can be moved by conventional drive means 62.

As parison 60 is fed downwardly, it encircles insert 34 and completely envelopes the same and the upper portion of mounting fixture 50 (FIG. 8). Mold sections 52 and 54 are then moved toward each other. Mold sections 52 and 54 are provided with opposed cavities 64 and 66, respectively. When mold sections 52 and 54 are engaged, cavities 64 and 66 define the outer surface configuration of nozzle 10. Mold sections 52 and 54 are provided with opposed land portions 68 and 70, respectively (FIGS. 11 and 12), which are arranged to compress a portion of the wall of parison 60 against the outer surface of insert 34. FIGS. 9 and 12 illustrate the position of mold sections 52 and 54 just prior to closing with land portions 68 and 70 compressing a portion of parison 60 against insert 34 and extruding some of the plastic material into grooves 42.

Mold sections 52 and 54 also are provided with lower knife-edge formations 72 and 74 and upper knife-edge formations 76 and 78 extending completely around the mold section cavities. Lower knife-edge formations 72 and 74 are adapted to engage against mounting fixture 50 for severing the lower portion of parison 60 while upper knife-edge formations 76 and 78 engage each other for severing the upper portion of parison 60. Thus, upon closing mold sections 52 and 54 about parison 60, a portion thereof is enclosed and pinched off.

As mold sections 52 and 54 are closing, land portions 68 and 70 continue to compress a portion of parison 60 against insert 34 and extrude a portion of the plastic material into grooves 42 until mold sections 52 and 54 are completely closed. Thus, the material between the outer surface of insert 34 and land portions 68 and 70 is compressed with some of the material being extruded into grooves 42 to fill the same and form the locking projections 44. As shown in FIG. 11, the wall thickness of the plastic material about insert 34 is reduced and the excess of material caused by such compression molding is accommodated in grooves 42. This parison portion of reduced wall thickness forms the neck portion of the finished article and during the blow molding operation, hereinafter described, divides the enclosed parison into a pair of hollow sections, identified by reference numerals 80 and 82 (FIG. 12), positioned within the mold section cavities and separated by neck portion 24.

Mounting fixture 50 is provided with means for introducing expansion fluid into each hollow parison section, such means comprising an axial passage 86 communicating with passage 36 of insert 34 and connected via a suitable conduit 88 to a source of compressed air 90. A radial passage 92 connects passage 86 with the interior of parison section 82. When mold sections 52 and 54 are closed, air under pressure is admitted into section 80 via passage 86 and passages 36 and 38 of insert 34 and into section 82 via passages 86 and 92 for expanding sections 80 and 82 into engagement with the cavity walls of mold sections 52, 54 to assume the shape of the cavities. Mold sections 52 and 54 are cooled, as by means of cooling water ducts 96 connected to a suitable source of cooling water 98. This cools and sets the molded plastic, causing it to retain the mold configuration.

After the molded article has set for a short period of time, mold sections 52 and 54 are opened and the article with insert 34 permanently affixed thereto is removed from mounting fixture 50. End portion 46 (FIGS. 1 and 2) is severed and removed, leaving the finished nozzle 10 in final form.

In order to maintain the plastic material of parison 60 within mold sections 52 and 54 in a molten, semi-fluid condition prior to cooling, mold sections 52 and 54 are heated by heating elements (not shown) enclosed in the walls of mold sections 52 and 54 and connected to a suitable heat source 100 via line 102. In this manner, parison 60 is maintained at or near its plasticizing temperature to facilitate the expansion thereof against the mold cavity walls and to facilitate the severing or pinching of the enclosed parison without requiring special cutting equipment or excessive forces to cut through a cooled plastic.

If desired, a vacuum source 104 can be connected to mold sections 52 and 54 via conduit 106 to withdraw air from between the parison and the cavity walls of mold sections 52 and 54. A strong suction force is not essential. All that is required is to relieve the pressure of any air that might be trapped between parison 60 and the cavity walls of mold sections 52 and 54, which trapped air would tend to prevent the parison from following the contour of the cavities of mold sections 52 and 54 as these mold sections are engaged about parison 60. The suction passages leading to the mold section cavities are minute so as to preclude the admittance of plastic material therein, while being sufficient to permit the desired withdrawal of air. Such withdrawal takes place as mold sections 52 and 54 close about the extruded parison 60 prior to the introduction of expansion fluid through mounting fixture 50. The introduction of expansion fluid into parison sections 80 and 82 causes the same to expand into conformance with the cavity wall defining surfaces of mold sections 52 and 54. Undesired inward collapsing of the parison wall is avoided by the force of the expansion fluid and the elimination of air between parison 60 and mold sections 52 and 54.

The feeding of the raw plastic material into extrusion die 56, the parison extruding operation, the opening and closing of mold sections 52 and 54 and the heating and cooling thereof, the withdrawal of air from between parison 60 and the cavity walls of mold sections 52 and 54, and the introduction of expansion fluid all are controlled in a timed relationship by suitable programming or control means 110. Since such controls are conventional, in and of themselves, they are only schematically shown in FIG. 10 and it is believed that no further description or amplification is necessary.

Although the plastic material used in the above described compression and blow molding operation is stated to be polyethylene, it should be understood that any suitable thermoplastic material can be employed, as desired. Likewise, this invention is not restricted to a method and apparatus for forming the specific nozzle depicted in FIGS. 1–5, but has utility in forming any configurated plastic article in which it is desired to permanently affix an insert thereto.

As a result of this invention, insert 34 is securely assembled in the nozzle during and by the molding of the latter. Molded lug formations filling the circumferentially spaced grooves 42 preclude relative rotation, as well as relative axial movement between insert and nozzle, the former being firmly embedded in the latter.

From the foregoing, it is apparent that the objects of the present invention have been fully accomplished. An improved method and apparatus is provided for permanently affixing an insert in a molded article by a combination of compression molding and blow molding. A preferred embodiment of this invention having been disclosed in detail, it is to be understood that this has been done by way of illustration only.

We claim:

1. The method of molding an article having an insert member permanently affixed thereto comprising: providing at least one interrupted recess in the outer surface of the insert member, positioning the insert member between a pair of cavity defining mold sections, introducing a length of hollow thermoplastic material between said mold sections and about said insert member to extend beyond the opposite ends of said insert member, moving said cavity defining mold sections into engagement about the thermoplastic material to sever a portion thereof and enclose the same, compressing a portion of said thermoplastic material between said mold sections and the outer surface of said insert member thereby dividing said enclosed portion of thermoplastic material into two hollow sections separated by said insert member and extruding portions of said compressed thermoplastic material into said interrupted recess of said insert member to form an interlock therebetween preventing axial and rotational movement of said insert member relative to said thermoplastic material when set, and introducing a fluid into one of said hollow sections and through said insert member into the other of said hollow sections to simultaneously expand both hollow sections of said thermoplastic material against said mold sections to form said article.

2. The method set forth in claim 1, wherein the compressed portion of said material is of lesser wall thickness than the expanded portions thereof.

3. The method set forth in claim 1, including maintaining said thermoplastic material substantially at its plasticizing temperature during the expansion thereof.

4. The method set forth in claim 1, including cooling said thermoplastic sections after expanding said thermoplastic sections against said mold sections.

5. The method set forth in claim 1, including evacuating air from the space between said thermoplastic sections and said mold sections during the expansion of said thermoplastic sections.

References Cited

UNITED STATES PATENTS

| | | | |
|---|---|---|---|
| 1,231,530 | 6/1917 | Roberts | 264—274 X |
| 1,858,650 | 5/1932 | Weida | 264—274 X |
| 1,986,374 | 1/1935 | Shippy | 264—274 |
| 3,146,286 | 8/1964 | Freed | 264—274 |
| 3,435,107 | 3/1969 | Conrad | 264—274 X |
| 3,358,062 | 12/1967 | Lemelson | 264—98 X |
| 3,502,758 | 3/1970 | Plummer | 264—94 X |
| 3,032,809 | 5/1962 | Willard | 18—5BS X |

FOREIGN PATENTS

| | | | |
|---|---|---|---|
| 1,134,820 | 8/1962 | Germany | 264—94 |

ROBERT F. WHITE, Primary Examiner

J. H. SILBAUGH, Assistant Examiner

U.S. Cl. X.R.

264—92, 98, 274; 425—326, 388